Nov. 5, 1968  G. F. PEZDIRTZ  3,409,247
SOLID STATE THERMAL CONTROL POLYMER COATING
Filed March 28, 1966
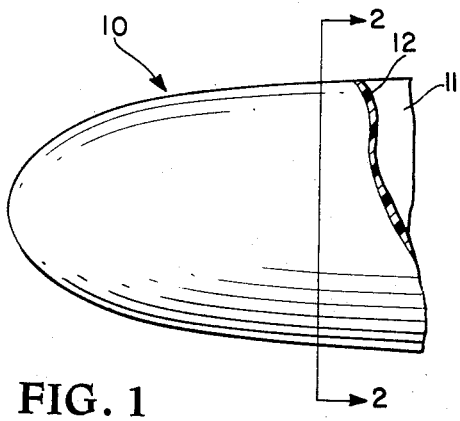
FIG. 1
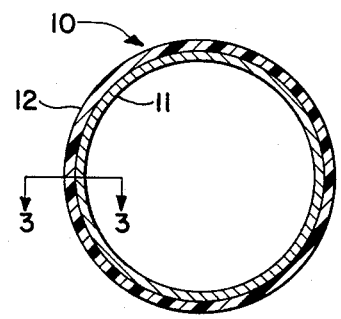
FIG. 2
FIG. 3
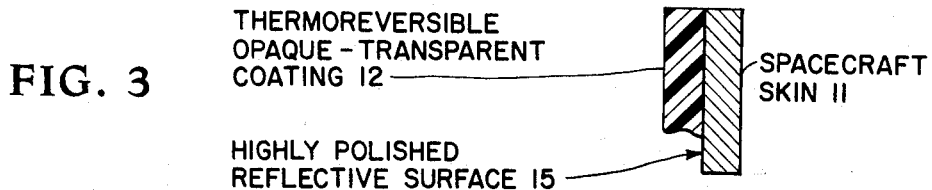
FIG. 4
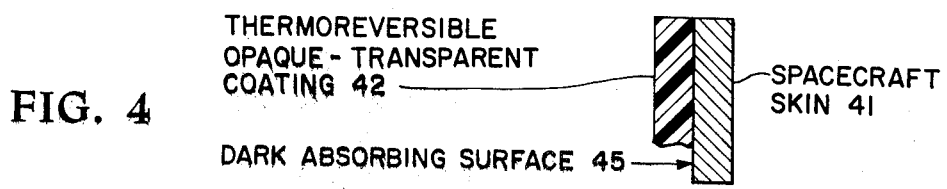
FIG. 5
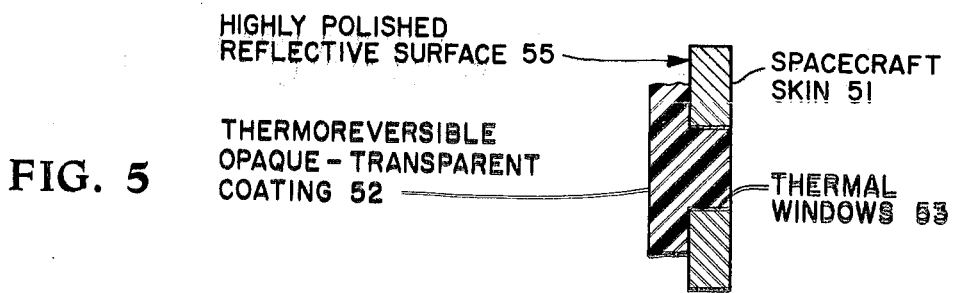
INVENTOR
GEORGE F. PEZDIRTZ
BY
ATTORNEYS United States Patent Office 3,409,247
Patented Nov. 5, 1968

3,409,247
SOLID STATE THERMAL CONTROL
POLYMER COATING
George F. Pezdirtz, Newport News, Va., assignor to the United States of America as represented by the Administration of the National Aeronautics and Space Administration
Filed Mar. 28, 1966, Ser. No. 538,907
4 Claims. (Cl. 244—1)

ABSTRACT OF THE DISCLOSURE

A thermosensitive coating for achieving thermal balance in a spacecraft with the coating being a unitary film of a polymer.

---

The invention described herein was made by an employee of the United States Government and may be manufactured and used by or for the Government for governmental purposes without the payment of any royalties thereon or therefor.

This invention relates generally to the thermal control of space vehicles, and relates with particularity to a solid state polymer with thermal optical properties for achieving thermal balance for a space vehicle when exposed to an ambient environment of variable electromagnetic radiation.

Thermal control of space vehicles has become an important part of space research inasmuch as optimum operation of numerous instrumentation employed in space vehicles, and the degradation of spacecraft materials, are directly related to the environmental temperature thereof. Previous methods of controlling the surface temperature of space vehicles have included surface oxidating coatings, vapor deposition of thin metallic film coatings, and partially coating the surface area of the spacecraft with paint to attain the desired effective thermal radiation characteristics. In addition, a recent novel thermal control coating, employed on a thin wall passive communications satellite and designed to achieve a specific constant solar absorptivity/surface emissivity ratio, is disclosed in U.S. Patent No. 3,176,399 by Dewey L. Clemmons, Jr., and assigned to the National Aeronautics and Space Administration. Although each of these prior art temperature control methods is adequate for the purposes intended, the problems in thermal degradation and other coating limitations, and the meticulous processes involved in applying some of these known surface coatings, somewhat limit their capabilities for use in present and contemplated spacecraft, particularly when the spacecraft is designed for long exposure to varying electromagnetic radiation in the infrared spectrum.

In the copending application 538,911 of William J. O'Sullivan, Jr., NASA Case No. 1243, filed concurrently herewith, or a Thermal Control Wall Panel, a number of thermoreversible opaque-transparent materials are disclosed for use in spacecraft and other wall panel constructions to achieve thermal balance therein. The present invention combines the advantageous features of these and other known thermal control systems while attempting to eliminate some of the disadvantages thereof.

Accordingly, it is an object of the present invention to provide a solid state thermal control polymer coating for achieving thermal balance of a particular spacecraft.

Another object of the present invention is a method of regulating the thermal balance of spacecraft by providing a solid state polymer thermal control coated surface thereon.

Another object of the present invention is the provision of a thermosensitive reversible opaque-transparent temperature control surface coating for a spacecraft.

A further object of the present invention is a novel thermal control coating surface for a spacecraft.

Yet another object of the present invention is a novel method of maintaining the thermal balance of a spacecraft when exposed to an ambient vacuum of space in which a predetermined desired temperature is maintained irrespective of the relative position of the spacecraft to the radiation of the sun.

Another object of the present invention is to provide thermal balance for a space vehicle by employing a novel cross-linked, solid state polymer coating on the spacecraft surface.

The foregoing and other objects are attainable in one aspect of the present invention by providing a surface coating formed of a high molecular weight polymer having a high melt viscosity in which cross-linking of the polymer to chemically bond the polymer chains together, to prevent individual polymer chain flow past each other and thereby convert the polymer from a high viscosity fluid to a solid state film or sheet, has been accomplished. This cross-linked or cured polymer is then employed as the external protective surface coating for a spacecraft in the desired thickness. A suitable adhesive or other conventional attachment is employed to secure the solid polymer to the exterior skin of the spacecraft, as is well known in the art.

The polymer employed must be a highly crystalline polymer to provide numerous small crystallites in the opaque state and thereby permit a minimum thickness being used for the thermal control coating. High molecular weight polymers treated in this manner have the inherent physical property characteristic of being opaque below a predetermined temperature and becoming transparent above this temperature. This critical temperature, or design temperature, is unique with each polymer and is a function of its molecular structure and, within limits, its molecular weight. Thus, by selecting a polymer having a normal melting temperature in the design temperature range of that desired for a particular spacecraft mission, the thermal control of the spacecraft at approximately this temperature level may be obtained by a minimum thickness coating of the specific polymer selected on the spacecraft.

A more complete appreciation of the invention and many of the attendant advantages thereof will be readily apparent as the same becomes better understood by reference to the following detailed description when considered in connection with the accompanying drawings, wherein:

FIG. 1 is a view of an exemplary space vehicle, with parts omitted and parts in section, employing a thermal control coating according to the present invention;

FIG. 2 is a section on line 2—2 of FIG. 1;

FIG. 3 is a section taken along line 3—3 of FIG. 2;

FIG. 4 is a slight modification of the spacecraft coated surface as shown in FIG. 3; and FIG. 5 is a view similar to FIG. 3 and illustrating another slight modification thereof.

Referring now more particularly to the drawings, wherein like reference numerals designate identical or corresponding parts throughout the several views, and more particularly to FIGS. 1 and 2, there is shown a space vehicle, generally designated by reference numeral 10, provided with a solid state polymer exterior surface coating 12. Coating 12 is adhesively or otherwise integrally attached to the skin 11 of space vehicle 10 in a conventional manner.

As shown more clearly in FIG. 2 and 3, the exposed surface of vehicle 10 is completely covered with the solid state polymer thermal control layer 12. The exterior of spacecraft skin 11, adjacent coating 12, is provided with a highly polished surface 15 for purposes to be more fully explained hereinafter. The solid state polymer film or coating 12 has the inherent physical property characteristic of being thermoreversible opaque-transparent to thereby undergo a reversible change in transparency upon changing temperature conditions.

Thus, film 12 will initially be opaque and a quantity of the incident sunlight, or electromagnetic radiation, will be absorbed and converted into heat. When film 12 attains its design temperature, the film will undergo a change from the opaque to a transparent state and substantially all of the incident light will be transmitted through the film without any additional rise in film temperature. As shown more specifically in FIG. 3, the highly reflective or polished surface 15 will serve to reflect the light transmitted through film 12 back toward the light source or the sun. Similarly, when film 12 decreases in temperature below its design or thermo-reversible temperature, the film again becomes opaque and will again tend to absorb incident radiation. It is thus readily seen that an equilibrium spacecraft skin temperature or thermal balance will be achieved at a temperature or range essentially equal to the thermoreversible design temperature of polymer coating 12. The structure exemplified in FIG. 3 would be particularly desirable when space vehicle 10 is headed toward the sun, that is, in an environment of increasing solar radiation with excess radiation being reflected from vehicle 10 by polished surface 15 after the attainment therein of a thermal balance for vehicle 10.

Referring now more particularly to FIG. 4, a thermal control polymer coating 42 having thermoreversible opaque-transparent property characteristics is shown integrally attached to the spacecraft skin 41. In this embodiment, spacecraft skin 41 is provided with a darkened or black surface 45 on the external area thereof adjacent coating 42. This particular design would be desired for space probes or missions where the space vehicles are traveling in a direction away from the sun or an environment of decreasing solar radiation.

The operation of this embodiment is very similar to that of FIG. 3, the embodiment described hereinabove. In this respect, electromagnetic radiation, or light, incident upon coating 42 will be partially absorbed and partially reflected with the energy absorbed thereby being converted into heat and resulting in a temperature rise in the coating. Upon the attainment of the specific design temperature of coating 42, it becomes transparent with subsequent radiation being transmitted therethrough and impinging on darkened surface 45 of spacecraft skin 41. Since dark surfaces tend to absorb, in contrast to light surfaces which tend to reflect, the incident radiation impinging on surface 45 will be substantially absorbed thereby with resulting increase temperature for surface 45 and, by conduction, an increase in temperature for spacecraft skin 41. Due to coating layer 42 being thermoreversible between opaque and transparent condition, incident-radiation will continue to be absorbed by the darkened area 45 as long as coating 42 is maintained above its design temperature. As in the previous embodiment, when the temperature of coating layer 42 drops below its design or thermoreversible temperature, this layer again becomes opaque with subsequent incident radiation again being partially absorbed by the layer. Thus, the embodiment of FIG. 4 will serve as a heating type coating and would prove particularly desirable for space vehicles or probes adapted for interplanetary flight.

Similarly, another application for a surface coating of this type would be in controlling the solar pressure on the surface of a particular satellite using solar pressure for station keeping, solar sailing, or the like. In this respect, when opaque, the polymer coating 42 would be partially reflecting and produce a solar pressure, almost twice that the solar pressure produced when the coating is transparent exposing a black or more readily absorbing substrate 45. It is readily seen that this application may be employed in guidance and control of a particular spacecraft on a predetermined space mission.

Referring now more particularly to FIG. 5, another embodiment of the present invention is schematically shown. As illustrated, spacecraft skin 51 is provided with one or more apertures, one of which is shown in FIG. 5 and designated by reference numeral 53, to serve as special optical windows. Coating 52, formed of a similar thermoreversible opaque-transparent polymer, as in the previously described embodiments, is secured to the exterior surface of spacecraft skin 51, in a conventional manner. Portions of coating 52 extend into optical windows 53 and provide the sole structure for this window. Upon the attainment of the design temperature of the thermoreversible coating 52, the coating becomes transparent with subsequent incident radiation being transmitted through the coating and through the extended portions thereof in optical window 53 to thereby provide a transparent window through spacecraft skin 51. Windows 53 may be utilized in various types of photographic-optical experimentations where transparency above a fixed or design temperature is desirable. For purposes of illustration, spacecraft skin 51 is shown in FIG. 5 as having a highly polished surface 55 on the external area thereof adjacent coating 52 although it is readily apparent that where a heating, in lieu of a cooling, type of surface coating is desirable, this highly polished surface may be replaced by a darkened or black surface, similar to darkened surface 45, as illustrated in FIG. 4.

The thermoreversible opaque-transparent physical property characteristics of polymer coatings 12, 42, and 52 will now be explained. Polymers suitable for use in the present invention may be broadly classified as crystalline polymers. Crystalline polymers are characterized by containing numerous crystallites, each of which is several hundred angstrom units in length. These crystallites, or ordered regions of the polymer chains, are embedded in an amorphous medium made up of entangled, or unordered, polymer chains. The minute crystallites have a different index of refraction than that of the amorphous polymer and, as a result, they scatter, refract, and reflect light internally so that polymers of this type, when provided of sufficient thickness, are essentially white in appearance. This is more easily understood when considering other mixed substances which are white in appearance, but known to be mixtures of two or more transparent materials, such for example, snow is a mixture of air and ice and, whipped egg white is a mixture of air and egg white. A further example of this is more readily apparent when considering a large crystal of sugar or table salt which appears transparent. However, when salt and sugar crystals are crushed into small pieces, they appear white due to the large increase in the refracting and reflecting surfaces which reflect and scatter the light from the increased surface areas of the small pieces. This same phenomena applies to the polymer crystallites which are randomly disposed in an amorphous polymer medium. These crystallites are also converted to an amorphous state when they are heated sufficiently to melt or overcome the secondary molecular forces of polymer crystallization. The temperature or temperature range at which the melting occurs may be referred to as $T_m$, or melting temperature. At $T_m$ the polymer becomes transparent and flows as a viscous liquid. The melt viscosity of a polymer at $T_m$ is also known to be a function of its molecular weight, that is, the higher the molecular weight, the higher the melt viscosity.

This flowing or softening phenomenon occurring upon temperature increase to $T_m$ can be overcome by cross-linking the polymer. Cross-linking involves nothing more than vulcanizing or curing of the polymer and may be accomplished by bonding the polymer chains together so that they cannot flow past each other. This cross-linking phenomenon is well known in the polymer art and can be accomplished chemically, in a conventional manner, by use of peroxides or other cross-linking agents, as for example, in the cross-linking of unsaturated polyesters with diallylphthalates. Cross-linking of polymers may also be conventionally accomplished by using high energy ionization radiation, such for example, high energy electrons, protons, X-rays, gamma-rays, and in some cases, by intense ultraviolet radiation. For example, polyvinylidene fluoride can be cross-linked to an infusible polymer with two megarods of gamma radiation. Cross-linking in this manner does not seriously impair crystallite formation when used in moderate extents.

Thus, by selecting a polymer with the appropriate $T_m$ for the temperature range in which the particular spacecraft is desired to be maintained, and cross-linking the polymer by chemical or radiation techniques, a cross-linked polymer may be converted into a solid state film capable of being used as a spacecraft thermal control coating that will undergo a transparency change at the $T_m$ of the particular polymer employed.

EXAMPLE POLYMERS

Polyethylene, a well known polymer is readily cross-linked by irradiation by exposure to twenty megarods of gamma radiation at a dose rate of two megarods per hour, while maintaining its transparency change or $T_m$ at approximately 110° C. When cross-linked in this manner, polyethylene undergoes a change in transparency from opaque to transparency at a $T_m$ of approximately 110° C. without experiencing any flowing from its solid condition. Other examples of this phenomena include poly(n-butyl) acrylate having a $T_m$ of 60° C.; polypentene-1, having a $T_m$ of 80° C.; and polybutene-1, having a $T_m$ of 128° C.

Each of these cross-linked polymers have a white appearance below its $T_m$ and will reflect a part of the electromagnetic radiation from the sun when disposed as a surface coating in the spacecraft while also absorbing part of the radiation. The electromagnetic radiation absorbed will be converted into heat by the coating and, by conduction, will increase the temperature of the spacecraft skin.

The equilibrium temperature or thermal balance for a space vehicle, as known, is determined largely by the solar absorptivity of the spacecraft skin relative to the surface emissivity of the surface. By employing a specific cross-linked polymer of the present invention as the exposed surface, the surface solar absorptivity/surface emissivity ratio may be controlled to that necessary to maintain the desired thermal balance for a specific space vehicle mission. A more complete discussion of the relationship of solar absorptivity/surface emissivity ratios and the influence thereof on thermal control is set forth in the copending application of O'Sullivan, and the Clemmons patent referred to hereinbefore.

Thus, it is readily seen that the present invention may be used to control the temperature of a spacecraft by heating or cooling as desired with this variable transparency coating resulting in a variable solar absorptivity/ surface coating. As mentioned hereinbefore, a cooling type surface as exemplified in FIG. 3 appears particularly desirable in space probes or missions traveling toward the sun while a heating surface, as exemplified in FIG. 4, would be more desirable for probes or missions heading away from the sun.

Although the invention has been described in connection with specific and detailed embodiments thereof, it is to be understood that the embodiments and specific polymer examples given are given by way of illustration only and are not to serve as limitations on applicant's invention. Accordingly, changes and modifications in the details of the invention described herein can obviously be made by those skilled in the art without departing from the spirit or scope of the invention. It is therefore to be understood that within the scope of the appended claims that the invention may be practiced otherwise than as specifically described.

What is claimed as new and desired to be secured by Letters Patent of the United States is:

1. A thermosensitive coating for achieving thermal balance in a spacecraft comprising:
   a reflective spacecraft skin,
   a unitary solid state adherent coating completely encasing said skin and forming the exterior surface of said spacecraft,
   said coating having the inherent physical property characteristic of undergoing reversible transparency by changing from an opaque to a transparent condition in response to an increase of temperature above a critical value resulting from incident electromagnetic radiation, and of changing from transparent to opaque upon a temperature decrease below the critical value,
   whereby said coating will absorb substantially all incident radiation until the attainment of the critical temperature level and thereafter transmit radiation to said reflective skin whereby said radiation is reflected from the spacecraft to thereby control the coated spacecraft to essentially the same temperature as that temperature at which reversible transparency of said coating is achieved.

2. The coating of claim 1 wherein said coating is a cross-linked polymer selected from the group consisting of:
   (a) poly(n-butyl) acrylate
   (b) polypentene-1
   (c) polyethylene, and
   (d) polybutene-1.

3. A coating for achieving thermal control of a spacecraft comprising:
   a reflective spacecraft skin,
   a unitary solid substantially opaque film of a cross-linked polymer integrally secured to and completely encasing said skin and forming the exterior surface area of a spacecraft,
   said opaque film having the inherent physical property characteristic of absorbing incident electromagnetic radiation and converting said absorbed radiation into heat and, upon attainment of a predetermined design temperature as a result of heat absorbed, becoming reversibly transparent to incident electromagnetic radiation and, upon decrease in film temperature below said design temperature level again becoming opaque whereby said electromagnetic radiation is reflected by said spacecraft skin when said coating is above said design temperature and is absorbed by said coating when said coating is below said design temperature to thereby stabilize the temperature of said coated surface substantially at the coating design temperature.

4. The coating of claim 3 wherein said cross-linked polymer is selected from the group consisting of:
   (a) poly(n-butyl) acrylate
   (b) polypentene-1
   (c) polyethylene, and
   (d) polybutene-1.

References Cited

UNITED STATES PATENTS

| 2,710,274 | 6/1955 | Kuehl | 73—53 X |
| 3,174,537 | 3/1965 | Meyer | 165—133 X |

OTHER REFERENCES

Polyethylene, Raff & Allison, Interscience Publishers, Inc., 1956, pp. 141–144.

MILTON BUCHLER, *Primary Examiner.*

B. BELKIN, *Assistant Examiner.*